US012604864B1

(12) United States Patent
Underwood, Jr.

(10) Patent No.: US 12,604,864 B1
(45) Date of Patent: Apr. 21, 2026

(54) UNIVERSAL ADJUSTABLE FEEDER

(71) Applicant: Orland M. Underwood, Jr.,
Kingwood, WV (US)

(72) Inventor: Orland M. Underwood, Jr.,
Kingwood, WV (US)

( * ) Notice: Subject to any disclaimer, the term of this
patent is extended or adjusted under 35
U.S.C. 154(b) by 0 days.

(21) Appl. No.: 18/935,994

(22) Filed: Nov. 4, 2024

Related U.S. Application Data

(60) Provisional application No. 63/596,458, filed on Nov.
6, 2023.

(51) Int. Cl.
*A01K 5/02* (2006.01)

(52) U.S. Cl.
CPC .......... *A01K 5/0225* (2013.01); *A01K 5/0291*
(2013.01)

(58) Field of Classification Search
CPC .. A01K 5/0218; A01K 5/0225; A01K 5/0275;
A01K 5/0287; A01K 5/0291; B67D 3/00;
B65D 51/242; B65D 90/0033
USPC ...................................................... 119/51.01
See application file for complete search history.

(56) References Cited

U.S. PATENT DOCUMENTS

| | | | | | |
|---|---|---|---|---|---|
| 3,834,593 | A | * | 9/1974 | James | A01K 5/0275 |
| | | | | | 222/440 |
| 3,845,744 | A | * | 11/1974 | Carr | A01K 5/0291 |
| | | | | | 119/51.13 |
| 5,044,318 | A | * | 9/1991 | Sutton | A01K 5/0241 |
| | | | | | 119/902 |

| | | | | | |
|---|---|---|---|---|---|
| 5,069,164 | A | * | 12/1991 | Wiwi | A01K 5/0241 |
| | | | | | 119/53 |
| 5,094,187 | A | * | 3/1992 | King | A01K 5/0241 |
| | | | | | 119/51.5 |
| 5,233,941 | A | * | 8/1993 | Ayliffe, Jr. | A01K 5/0225 |
| | | | | | 119/57.91 |
| 5,245,949 | A | * | 9/1993 | Hively | A01K 5/0225 |
| | | | | | 119/53 |
| 5,291,855 | A | * | 3/1994 | Laverty | A01K 39/0113 |
| | | | | | D30/128 |
| 5,570,656 | A | * | 11/1996 | Waldner | A01K 5/0225 |
| | | | | | 119/53.5 |
| 5,640,926 | A | * | 6/1997 | Kleinsasser | A01K 5/0225 |
| | | | | | 119/53 |

(Continued)

FOREIGN PATENT DOCUMENTS

| | | | | | |
|---|---|---|---|---|---|
| DE | 10211256 | A1 | * | 10/2003 | B65D 90/626 |
| DE | 202021001942 | U1 | * | 7/2021 | A01K 5/0225 |
| GB | 1292185 | A | * | 10/1972 | A01K 5/0225 |

*Primary Examiner* — Christopher D Hutchens
*Assistant Examiner* — Erica Michelle Huebner
(74) *Attorney, Agent, or Firm* — Karen Tang-Wai Sutton

(57) ABSTRACT

A universal feeder for storing and dispensing multiple types
of dry animal feed and for feeding multiple types of animals.
A vertically movable covered container wall with a storage
space is positioned over a feeder tray having both flat and
sloped portions, with a wall adjuster attached to the con-
tainer wall adapted to lift and lower the container wall
relative to the feeder tray so as to open or close a feed
dispensing slot formed between a lower end of the container
wall and the flat portion of the feeder tray. The sloped
portions of the feeder tray direct animal feed towards a side
and front of the feeder tray when the feed dispensing slot is
open. Manual and motorized options control movement of
the container wall. Optional useful accessories such as
timers, sensors and wireless capabilities are also included.

17 Claims, 16 Drawing Sheets

(56) References Cited

U.S. PATENT DOCUMENTS

| | | | | |
|---|---|---|---|---|
| 6,199,511 B1 * | 3/2001 | Thibault | .............. | A01K 5/0241 |
| | | | | 119/53.5 |
| 6,575,117 B1 * | 6/2003 | Rasmussen | .......... | A01K 5/0291 |
| | | | | 119/57.1 |
| 6,761,129 B1 * | 7/2004 | Smith | .................. | A01K 5/0225 |
| | | | | 119/52.1 |
| 2009/0020074 A1 * | 1/2009 | Harman | ................. | A01K 39/00 |
| | | | | 119/51.11 |
| 2014/0083364 A1 * | 3/2014 | Anderson | .............. | A01K 15/02 |
| | | | | 119/51.01 |
| 2015/0181801 A1 * | 7/2015 | Niemela | .............. | A01C 17/001 |
| | | | | 119/51.01 |
| 2019/0014742 A1 * | 1/2019 | Leggett | ................ | A01K 5/0291 |

* cited by examiner

<u>FIG.1</u>

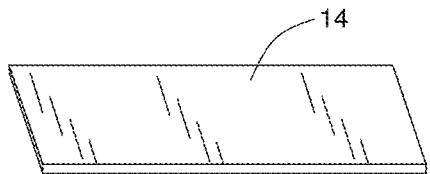
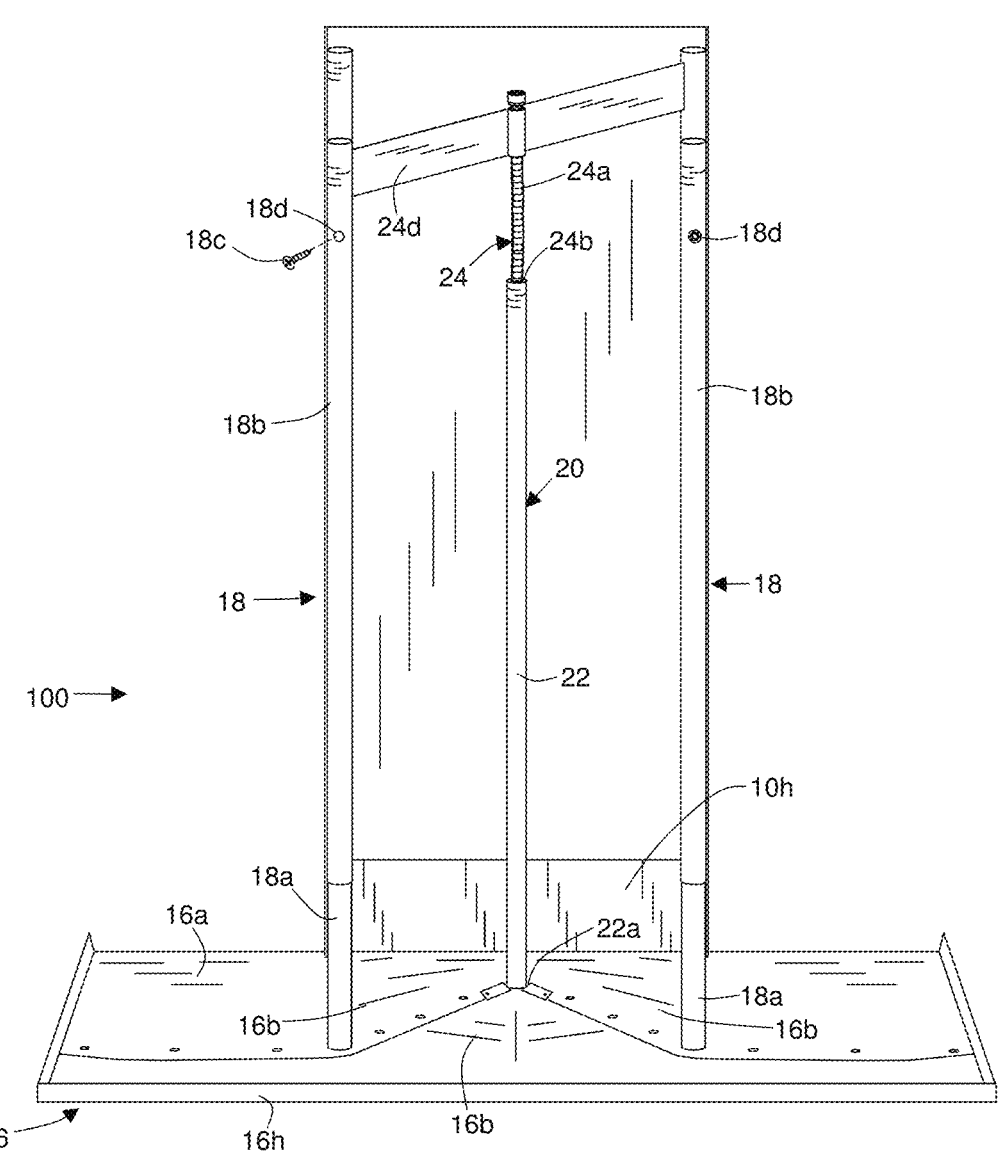
FIG.2

UNIVERSAL ADJUSTABLE FEEDER

CROSS-REFERENCE TO RELATED APPLICATIONS

This application is claims priority from U.S. provisional application Ser. No. 63/596,458 filed on 6 Nov. 2023, whose disclosure is hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE ONLINE PATENT CENTER SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of food dispensers for animals, specifically, a universal feeder assembly for storing and dispensing a variety of different types of food for a variety of different types of animals.

BACKGROUND ART

Humans have been feeding animals for thousands of years, whether the animals are pets, livestock, or wild animals fed for the sheer enjoyment of observing the animals while eating. This human activity has resulted in the creation of many different types of feeding assemblies designed for the particular animal and food being fed. Songbirds have a variety of different bird feeders designed for specific types of seeds and birds. Dogs and cats are fed in shallow open bowls, and in some cases, with automatic dispensers that fill water bowls and food bowls with dried kibble. Cows, horses, and other ungulates are often fed hay in cradle or round bale feeding rings, to allow the animals access to the hay but prevent them from trampling it. Pigs are often fed by placing food in long troughs that are raised off the ground. Deer feeders can be as simple as positioning corn cobs into a tray or on the ground or more complicated feeders that broadcasts feed and uses noise to alert deer to the dispensing of food. There are as many different feeding assemblies as there are types of animals to be fed, along with the wide variety of foods used to feed these animals.

Given the variety of feeders assemblies designed to feed specific types of animals and specific types of foods, a farmer or other individual with a variety of animals that must be fed, purchases many different types of feeders according to the animals' needs, characteristics, and preferred feed, creating additional costs and also additional manual labor and logistics. Most feeders are manually filled, and small capacity feeders require regular replenishment. Certain animals cannot be allowed unlimited food access, so the feeder is filled only enough for a particular meal and then must be refilled at the next meal time or removed entirely from the feeding area. Outdoor feeding is particularly difficult because the feeding assembly must be able to endure harsh weather to prevent the food from spoilage and be strong enough to prevent unwanted animals, such as bears, from destroying the feeders to gain access to stored food. Bears, raccoons, and rodents are particularly challenging feeder assembly visitors, with bears being able to push over or otherwise destroy feeders and raccoons and rodents able to pry and chew through even heavy duty plastics or wires. Access of the food by the intended animals and limiting unintended animal access is one common complaint about all feeding assemblies.

Farmers who raise animals spend a considerable amount of time and money feeding their animals. With the dwindling number of farmers, along with smaller farm families, many farmers must either rely on hired help, increasing costs of production, or more commonly are now actively seeking technological solutions to mechanize their farm chores to allow fewer people to nevertheless perform all the farm feeding chore work effectively.

What is needed is a universal feeder assembly designed to feed a variety of different types of foods to a variety of different types of animals. What is also needed is a feeder assembly that can control the rate at which food is dispensed from the storage portion of the feeder. What is still also needed is a feeder assembly with a large food storage capacity to reduce the number of times the feeder must be filled, that can be left outside and secured against theft or movement by bears or other animals, and which protects the stored food from spoilage. What is finally needed is a feeder assembly whose dispensing can be controlled wirelessly, manually, or both and which allows the farmer to take stock of the amount of feed left in the storage portion at any given time.

DISCLOSURE OF INVENTION

A universal feeder comprising a container having a container wall defining an interior feed storage space, the container wall supported on a feeder tray by one or more telescoping support legs attached to both the container and to the feeder tray, and a telescoping wall adjuster attached to the feeder tray at one end and to a horizontal element that is also attached to the container wall at another end, such that the wall adjuster is perpendicular horizonal element, where a feed dispensing slot is created between a lower end of the container wall and the feeder tray, with a variable slot size controlled by the wall adjuster raising or lowering the lower end of the container wall in relation to the feeder tray. An upper end of the container wall is further comprised of a removable lid, in some embodiments hingeably affixed and adjustably secured, to allow access to the interior feed storage space but to secure the lid securely thereto to prevent unwanted access to the feed storage space.

In a first aspect of the invention, a position of the container wall and the feed dispensing slot is controlled by either a hand crank or an electric motor attached to the wall adjuster and rotating a moving tube of the wall adjuster.

In a second aspect of the invention, the feeder tray has a sloped portion and a flat portion, the flat portion surrounded by a lip, and the sloped portion positioned such that when the feed dispensing slot is closed, the sloped portion is housed within the storage space of the container wall and the lower end of the container wall rests on the flat portion of the feeder tray. In some embodiments, the feeder tray is a single unit and in other embodiments, the feeder tray is further comprised of two mating portions.

In a third aspect of the invention, the universal feeder is further comprised of an inner wall positioned along a back side of the container wall with a back wall of the feeder tray forming a ridge with the sloped portions of the feeder tray to create three sloped portions of the feeder tray directing a quantity of feed stored in the storage area to the three sloped portions to be dispensed out of the feed dispensing slot.

In a fourth aspect of the invention, the container wall has at least two side walls formed with wall apertures and fasteners to allow the at least two side walls to be removably affixed.

In a fifth aspect of the invention, the container wall has four corners in the interior storage space, with one telescoping support leg positioned in each corner of the four corners inside the storage space or positioned near each corner outside the storage space.

In a sixth aspect of the invention, the telescoping wall adjuster is positioned inside or outside the storage space.

In a seventh aspect of the invention, the back side of the container wall is further formed with one or more brackets adapted to be used with a strap to secure the container wall to a tree or other fixed structure.

In an eight aspect of the invention, the container wall position is adjusted using a motor in communication with a power supply, controller and a wireless transmitter and receiver, whereby instructions received by the receiver are communicated to the motor to move the container wall so as to open or close the feed dispensing slot or adjust a size of the feed dispensing slot. In some embodiments, a sensor, camera, timer, or combinations thereof are used with the wireless transmitter and receiver, controller, power supply and motor to receive instructions from a user, and/or collect data to transmit to the user, controller, or to another universal feeder.

In a last aspect of the invention, the controller further includes an artificial intelligence module adapted to receive selected information from one or more of the camera, sensor, light, or speaker and create a schedule for opening and closing the feed dispensing slot based on the selected information received.

BRIEF DESCRIPTION OF THE DRAWINGS

The features and advantages of the invention will become apparent from a consideration of the subsequent detailed description presented in connection with accompanying drawings, in which:

FIG. 2 is a partially exploded view of the universal feeder in FIG. 1, shown with a lid and a front side wall removed.

DRAWINGS LIST OF REFERENCE NUMERALS

Figure 1:
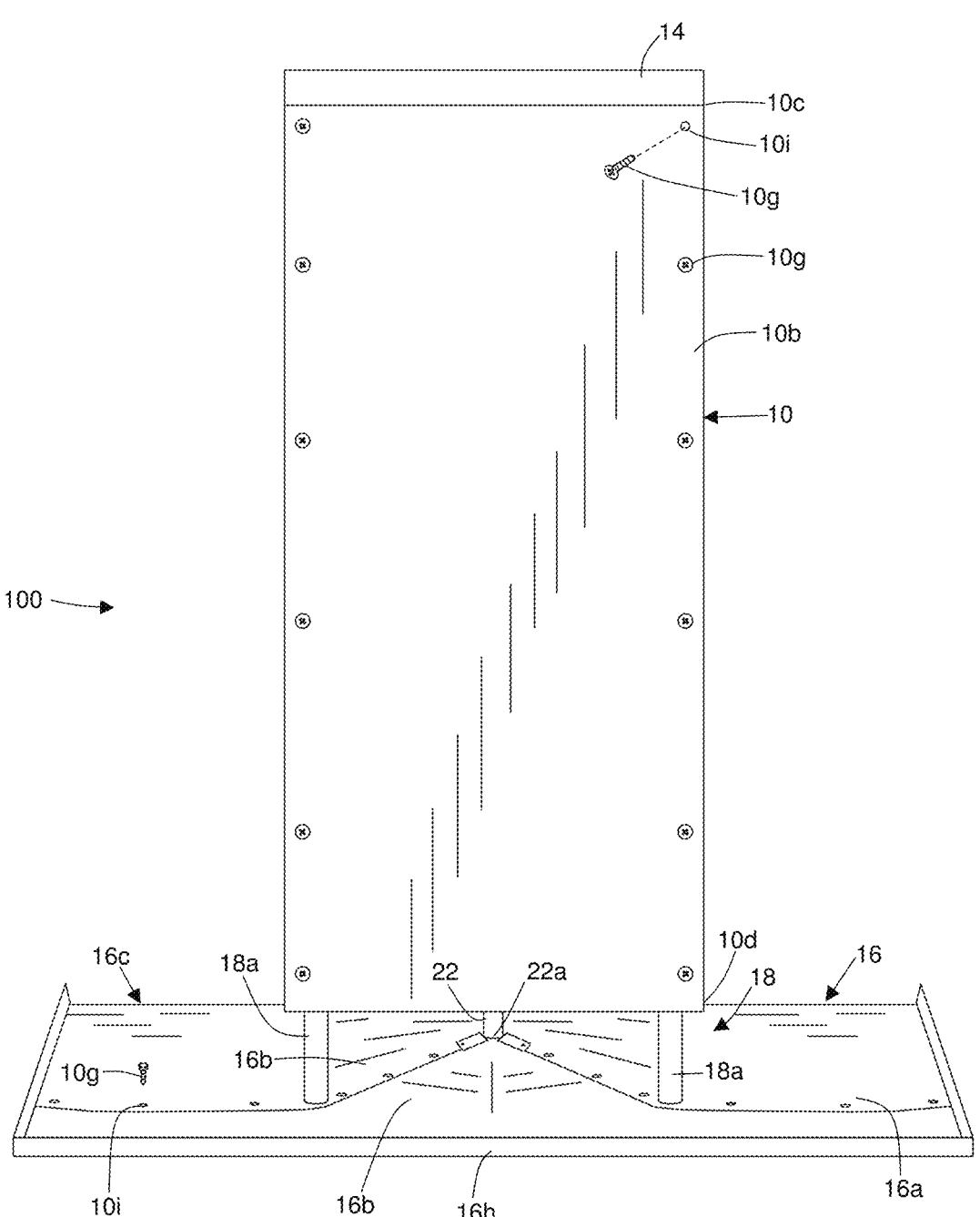
FIG. 1 is a front perspective view of a universal feeder according to the invention, shown with a feed dispensing slot in an open position.
Figure 3:
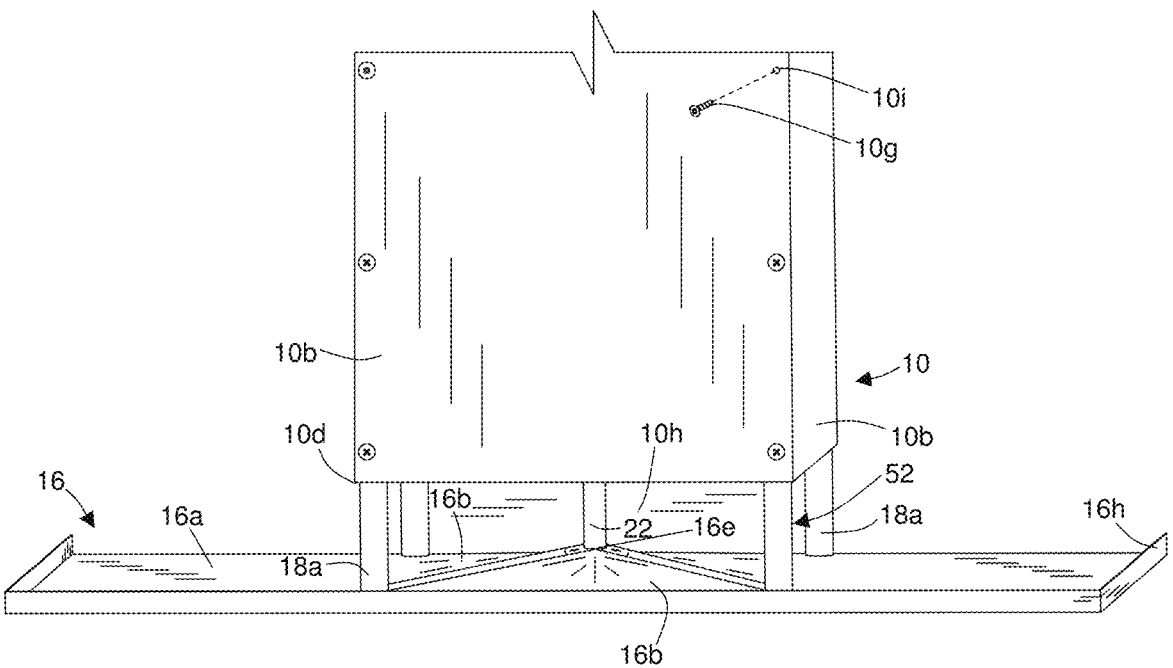
FIG. 3 is a partial close up front perspective view of the universal feeder in FIG. 1, highlighting sloped and flat portions of a feeder tray.
Figure 4:
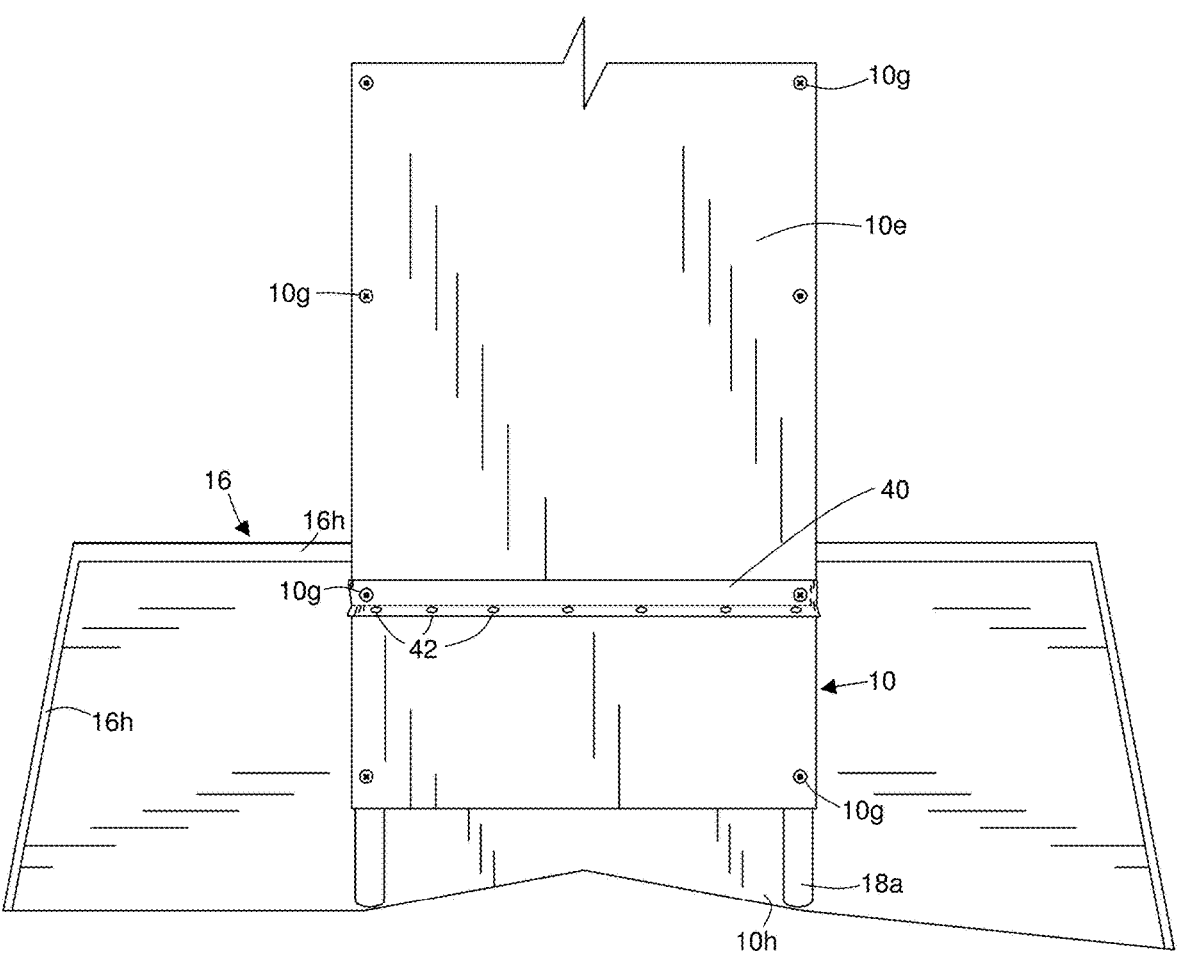
FIG. 4 is a partial close up back perspective view of the universal feeder in FIG. 1, highlighting an inner wall, sloped feeder tray floor and a bracket affixed to the back side of the container wall.

The following is a list of reference labels used in the drawings to label components of different embodiments of the invention, and the names of the indicated components.

100 universal adjustable feeder assembly or universal feeder or feeder
110 power operated assembly
10 side wall
10a inner-facing side
10b outer-facing side
10c upper end
10d lower end
10e inaccessible side or back side
10f lid spring
10g bolt
10h inner back wall
10i hole
10j nut
12 storage space
14 lid
14a hinge
14b latch
16 feeder tray
16a flat portion of feeder tray
16b sloped portion of feeder tray
16c upper or feed-facing side of feeder tray
16d lower or ground-facing side of feeder tray
16e apex of sloped portions or apex
16g back wall of feeder tray
16h lip
18 telescoping support leg
18a bottom end of telescoping support leg
18b container end of telescoping support leg 18c positional coupler
18d leg aperture
20 telescoping wall support or wall adjuster
22 outer tube or fixed tube
22a tube base end
22b fixed tube top end
22c internal thread
24 inner tube or moving tube
24a threaded end
24b threads
24c handle end
24d horizontal element
24e attachment point for horizontal element
26 crank handle
28 motor
30 power supply
32 controller
34 camera
34b sensor
36 wireless receiver/transmitter
40 bracket
42 bracket hole
44 strap
50 food or feed for animals
52 feed dispensing slot
54 turkey
56 deer

DETAILED DESCRIPTION

Figure 7:
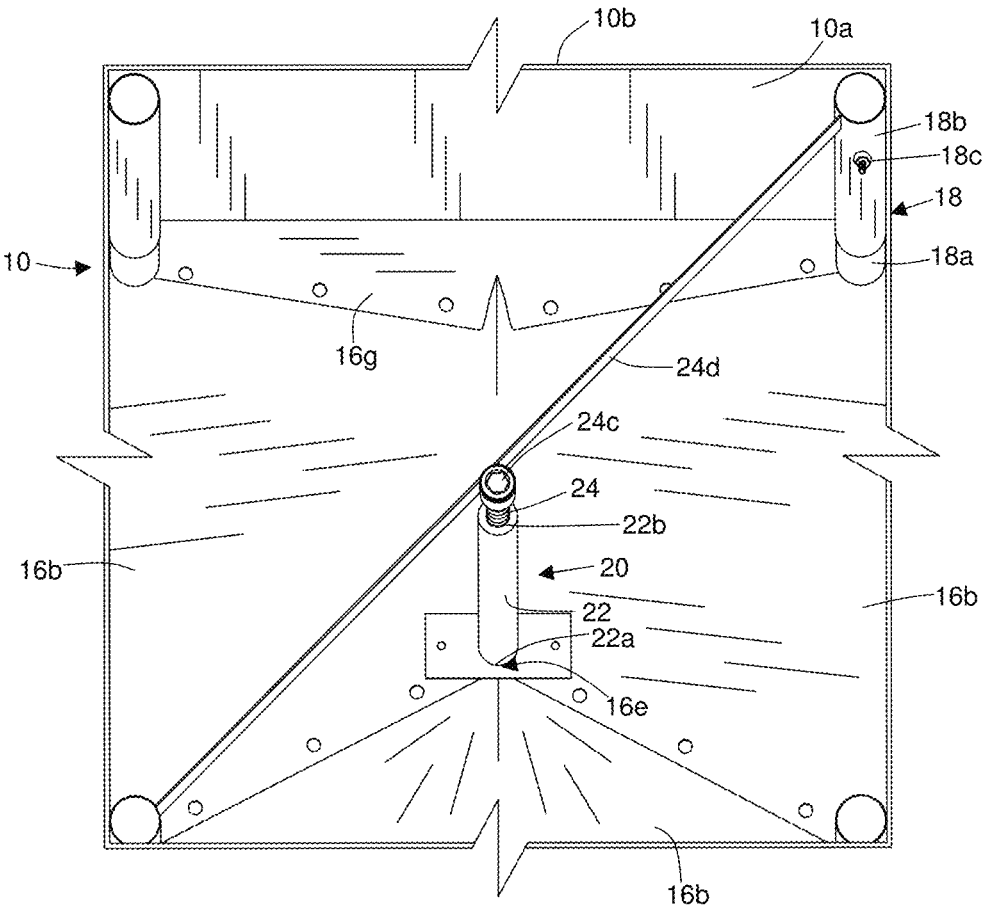
FIG. 7 is a detail top view of the universal feeder according to the invention showing a storage space inside the container.
Figure 7A:
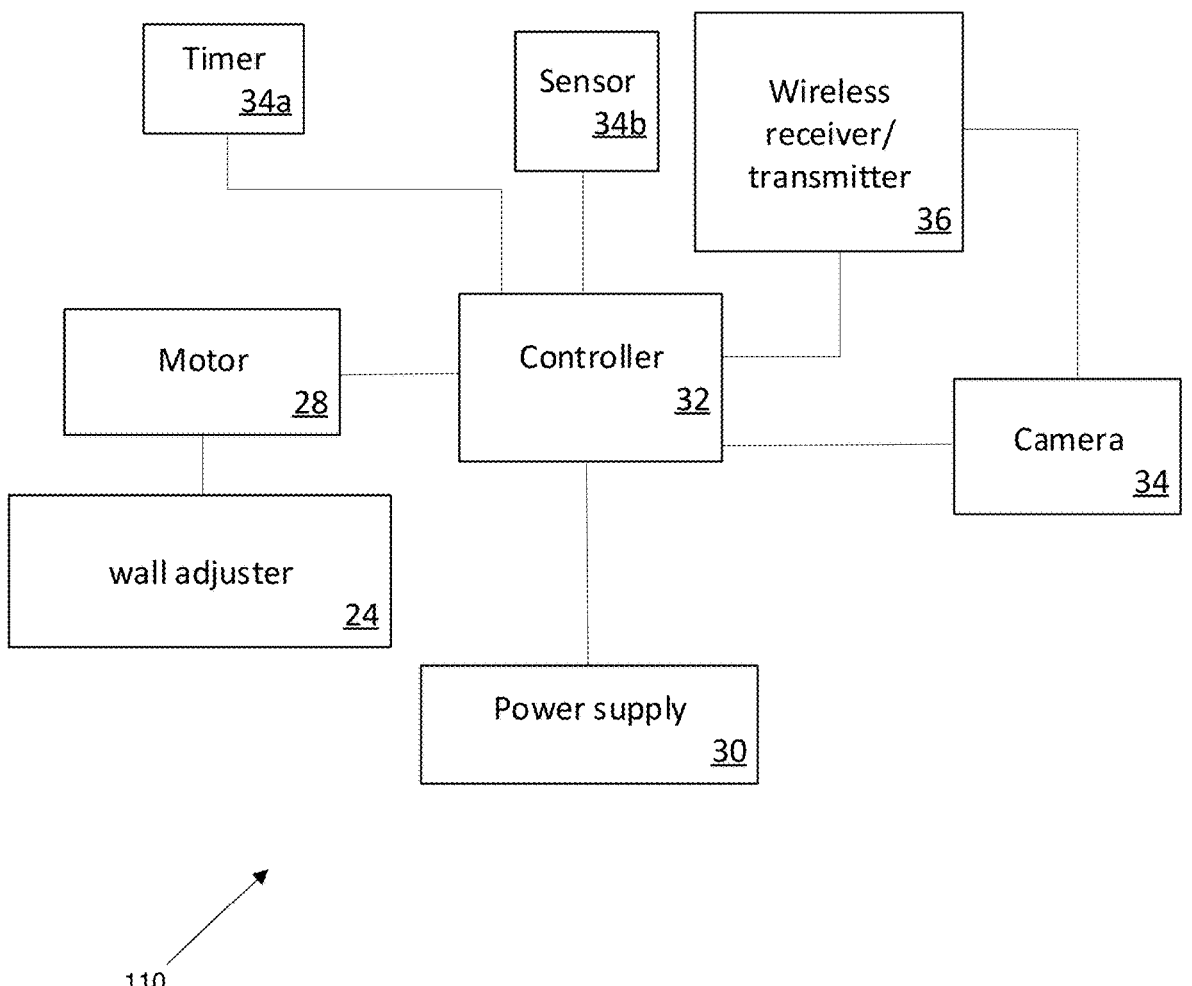
FIG. 7A is a schematic showing a motorized embodiment for lifting and lowering the container wall and optional improvements for wireless control and data collection and transmission.

A universal adjustable feeder assembly or universal feeder 100 according to the invention is shown in the FIGS. as a manually operated assembly, and in FIG. 7A showing a power operated assembly 110.

Turning to the FIGS., the universal feeder 100 is comprised of a covered telescoping container wall, a container storage space 12 for storing food, lifting/lowering means, and a feeder tray 16 for receiving a quantity of gravity dispensed food or feed 50.

In the representative embodiment in the FIGS., the container is comprised of four side walls 10 removably affixed via a series of holes 10i adapted to receive a series of fasteners 10g 10j, so as to form a tube with a square or rectangular cross section, with an outer-facing side 10b and an inner-facing side 10a, the inner-facing side 10a defining the storage space 12 of the container, the container having a removable cover or lid 14 at a side wall upper end 10c to open or close off the upper end 10c, and a feeder tray 16 to close off a lower end 10d of the side wall. Lifting the container creates a feed dispensing slot 52 with a variable height that is adjustably determined by a user. A quantity of feed 50, typically dried foods, including corn on the cob, hay, as well as smaller pieced foods such as seeds and shelled corn, are positioned inside the storage space 12 by removing the lid 14, filling the storage space 12, and returning the lid 14 to secure the container upper end 10c.

The feed 50 is dispensed from the container by lifting the side walls 10 off the feeder tray 16 to create the feed dispensing slot 52. In some embodiments, the container is configured as a single, seamless continuous side wall 10 with a circular, semi-circular, triangular, square, or rectangular cross section, or any other desired cross section. This type of seamless single wall construction is designed for the user who is not concerned about storage or shipping of the universal feeder 100. The representative embodiment shown in the FIGS. having four side walls 10 is designed so that it can be disassembled and stored flat to save and for ease of transportation. The term "side wall" or "side walls" in this disclosure are used interchangeably, and mean at least one continuous wall, or a single wall panel, or two or more walls joined together, either permanently or removably, to form the container.

The side wall 10 of the container is further comprised of an inner-facing side 10a, and an outer-facing side 10b. The removable lid 14, sized and shaped to cover the upper end of the side wall 10 can be joined to the side wall 10 by a hinge 14a and secured to the side wall 10 by a latch 14b, or any other known mechanical fastener means of securing the lid 14 to a container. The lid 14 must be securely attached to the upper end 10c to prevent bears and other animals from accessing the storage space 12. The side wall 10 is made of weather resistant material, typically metal and other materials or combinations of materials that can withstand temperature changes, moisture, and biting or scratching by animals. One or more brackets 40 with bracket holes 42 are affixed to a back side 10e of the outer-facing side 10b of the side wall 10, to allow the universal feeder 100 to be secured to a tree, fence or other structure using a strap 44 to prevent removal or tipping. The representative embodiment in the FIGS. shows a pair of brackets 40 in spaced apart relationship on the inaccessible or back side 10e of the outer-facing side 10b of the side wall 10. This back side 10e typically faces a tree or wall.

The side wall 10 is supported by one or more telescoping support legs 18, shown in the FIGS. a bipartite leg in each interior corner of the container in the representative embodiment. The inventor notes that the support legs 18 can also be attached to the outer-facing side 10b of the container, but the interior attachment further protects the support legs 18 from the effects of weather and physical damage by animals. A first part or bottom end 18a of the support leg 18 is attached to the feeder tray 16 and is in telescoping relationship with the second part or container end 18b of the support leg 18, the container end 18b affixed to the inner-facing side 10a of the container in the representative embodiment such that when the side wall 10 is lifted, the container end 18b rises and uncovers the bottom end 18a of the support leg 18.

Figure 5:
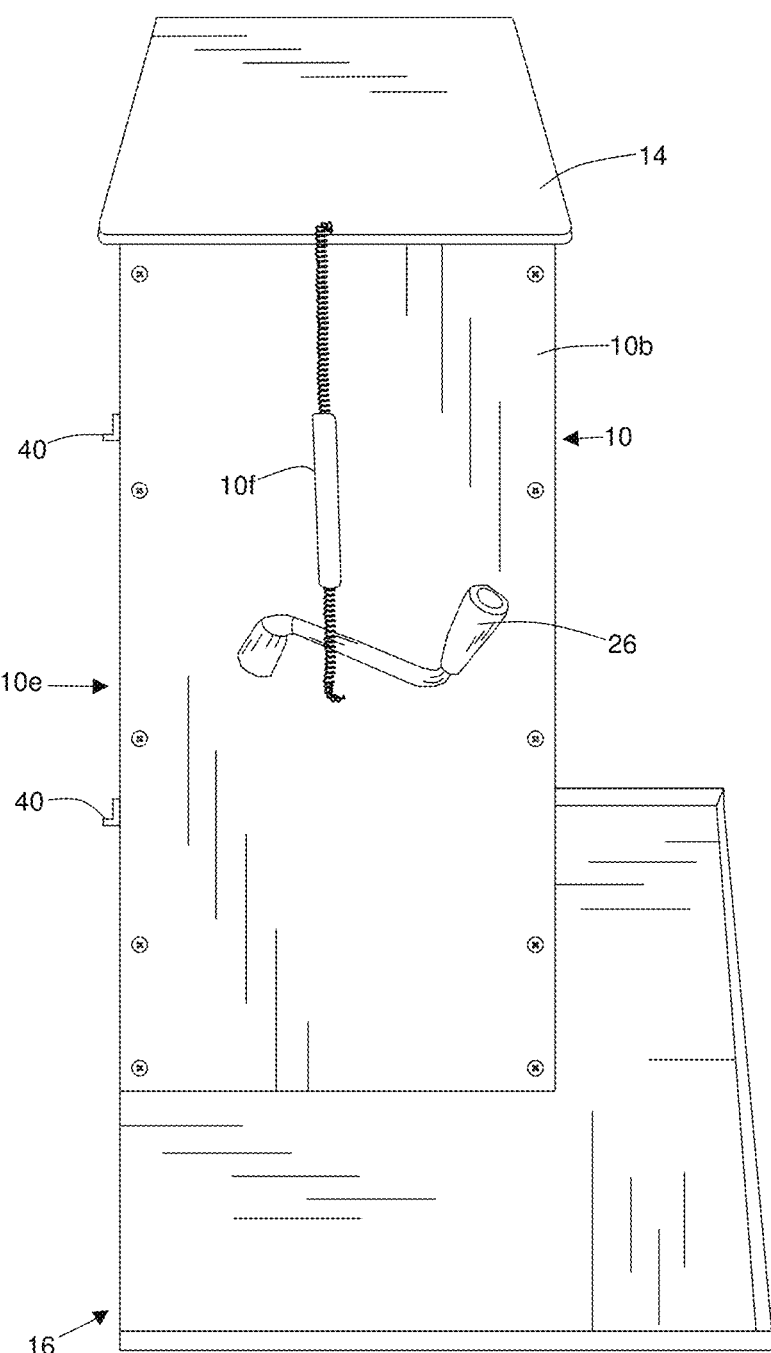
FIG. 5 is a side view of the universal feeder according to the invention, shown with the feed dispensing slot in a closed position and showing an optional spring for securing the lid to the container wall and a removable crank handle conveniently stored between the spring and the container exterior wall.
Figure 6:
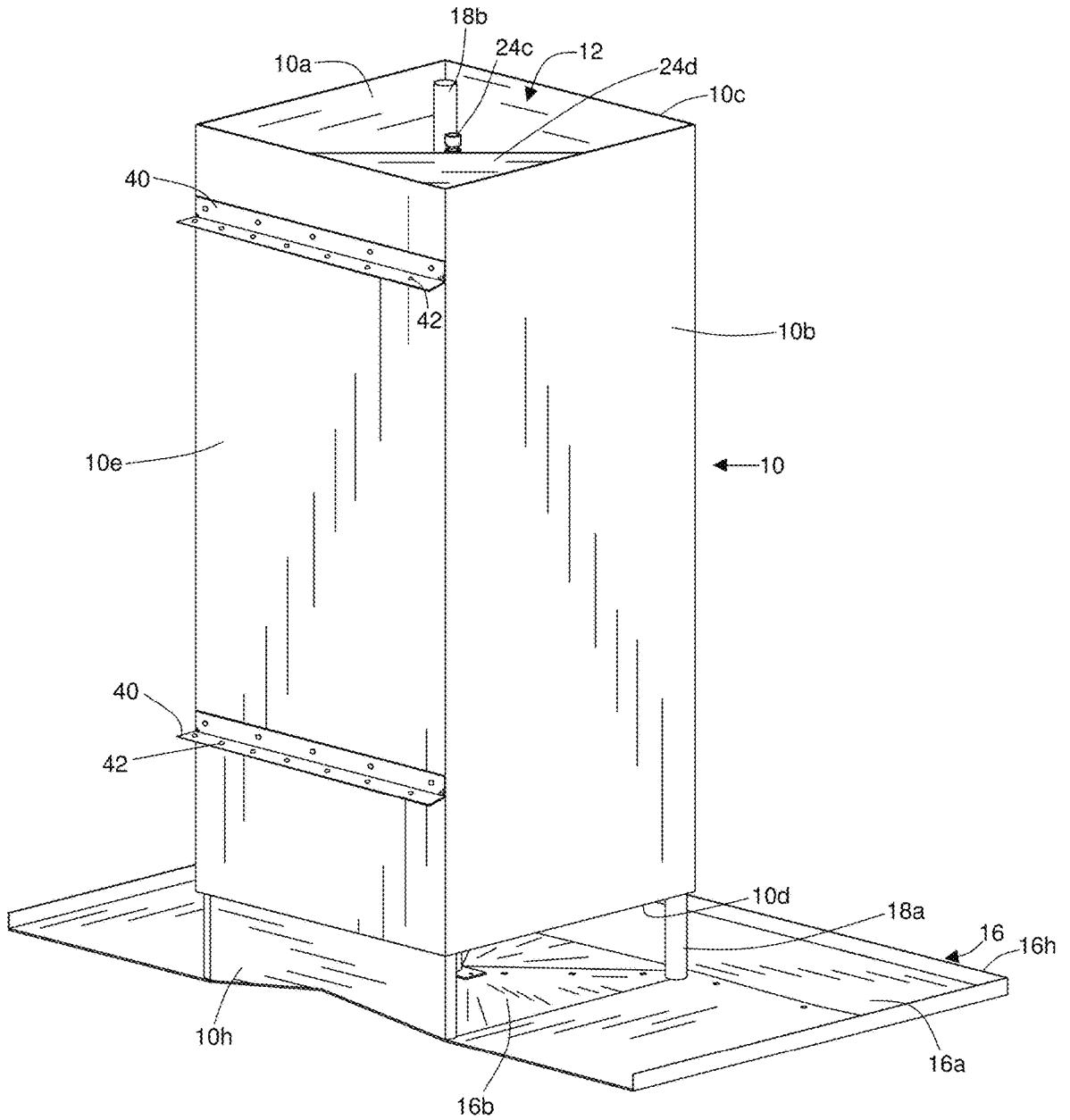
FIG. 6 is a back perspective view of the universal feeder according to the invention.

When the side wall 10 is lowered, the container end 18b lowers over the bottom end 18a accordingly, and when the container end 18b is fully lowered over the bottom end 18a, the lower end 10d of the side wall 10 rests on the feeder tray 16, as shown in FIG. 5, thus closing off the container at its lower end 10d and closing the feed dispensing slot 52. The representative embodiment in the FIGS. shows four support legs 18, however at least one support leg 18 is needed to stabilize the side wall 10, particularly against animals that may bump or attempt to breach the container, and the support leg 18 may be shaped as a relatively thin tube leg as in the representative embodiment or a widened, wall-like leg (not shown) as needed, and can be located anywhere along the side wall 10. If a widened support leg 18 is used, it may be used as a substitute for an inner back wall 10h positioned between a pair of support legs 18 positioned at the back side 10e of the universal feeder 100 that is shown in the representative embodiment.

The feeder tray 16 is formed with an upper or feed-facing side 16c and a lower or ground-facing side 16d, a flat portion 16a and a sloped portion 16b, with the feed-facing side 16c of the sloped portion 16b positioned inside the container storage space 12 when the lower end 10d of the side wall 10 rests on the feed-facing side 16c of the feeder tray 16 as in FIG. 5. The sloped portion 16b in the representative embodiment is further comprised of three triangular sloped faces whose uppermost apexes converge at an apex 16e of the sloped portion 16*b*, where a centrally located telescoping wall support or wall adjuster 20 is positioned at the apex 16*e*.

The sloped portion 16*b* has three faces so as to resemble a pyramid, with a potential fourth face instead forming a ridge or back face 16 of the feeder tray 16, so that the sloped portions 16*b* on each side effectively extend to the back wall 10*e* of the container. This arrangement prevents the feed 50 from sliding towards the back side 10*e* of the universal feeder 100, where it will be inaccessible to animals and thus also prevents pockets of feed from remaining in the storage space 12 where it might otherwise spoil. The feeder tray 16 is further comprised of an inner wall 10*h*, shown in the representative embodiment in the FIGS. positioned between the support legs 18 at the back side 10*e* of the container. The inner wall 10*h* has a wall height sufficiently tall enough such that a largest feed dispensing slot 52 size does not cause the container lower end 10*d* to lift beyond an uppermost end of the inner wall 10*h*. The inner wall 10*h* prevents the feed 50 from exiting out the back side 10*e* of the universal feeder 100, with the back face 16*g* and sloped sides 16*b* of the feeder tray 16 ensuring the feed 50 is directed towards a front and sides of the universal feeder 100 and away from the back side 10*e* of the universal feeder 100. In this disclosure, the back side 10*e* of the universal feeder 100 means a side generally inaccessible by feeding animals due to its position against a tree, wall or other structure and generally, the back side 10*e* is a same side upon which the bracket 40 is positioned, and thus the inner wall 10*h* ensures that the feed 50 to be dispensed is optimally directed where it can be accessible.

In embodiments where the support leg 18 is a single, widened leg (not shown), the inner wall 10*h* can be excluded if the single, widened leg is positioned along the back side 10*e* of the universal feeder 100 and in the representative embodiment in the FIGS., the inner wall 10*h* could also be configured as a single wall with a curve or bend that closes off the back side 10*e* of the universal feeder 100 and directs the quantity of feed 50 to be dispensed to the front and sides of the feeder tray 16. The inner wall 10*h* can be affixed to the feeder tray 16, to the support legs 18 or to both, or could be removably affixed, using known mechanical means such as a pushing the inner wall 10*h* into slots formed into the support legs 18 sized to receive the inner wall 10*h*.

The wall adjuster 20, in the representative embodiment in the FIGS. is comprised of a centrally positioned and rotatably telescoping vertical assembly with a perpendicular horizontal element 24*d* engaging both the vertical assembly and the side wall 10 of the container. The wall adjuster 20 is comprised of an outer tube 22 and an inner tube 24, the inner tube 24 in rotatable telescoping relationship with the outer tube 22. The outer tube 22 is a hollow tube further comprised of a tube base end 22*a* affixed to the feeder tray 16 at the apex 16*e*, and a top end 22*b* formed with an internal thread 22*c*. The inner tube 24 is further comprised of an outside thread 24*b* at its threaded end 24*a* mateable with the internal thread 22*c* of the top end 22*b* of the outer tube 22, and an opposed handle end 24*c* adapted to receive either a removable crank handle 26 or other means used to rotate the inner tube 24 in and out of the outer tube 22, thus raising or lowering the side wall 10 of the container. The FIGS. show the outer tube 22 attached to the feeder tray 16 however the inventor notes that the tubes 22 24 could be inverted, so that the inner tube 24 is rotatably attached at the apex 16*e* of the feeder tray 16 and with the outer tube 22 attached to the horizontal element 24*d*, or the outer tube rotating around a fixed position inner tube. Most simply, the wall adjuster 20 has a fixed tube in rotating, telescoping relationship with a moving tube. The terms "fixed" and "moving" are relative terms and can refer to either the inner tube or the outer tube, and either tube can be moving or fixed whether immediately attached to the feeder tray 16 or not. Hence the FIGS. showing the fixed tube as the outer tube 22 and the moving tube as the inner tube 24 are not meant to limit the wall adjuster 20 to the representative embodiment shown, or limit as to which of the inner and outer tubes 24 22 is the moving or fixed tube of the wall adjuster 20.

Figure 8:
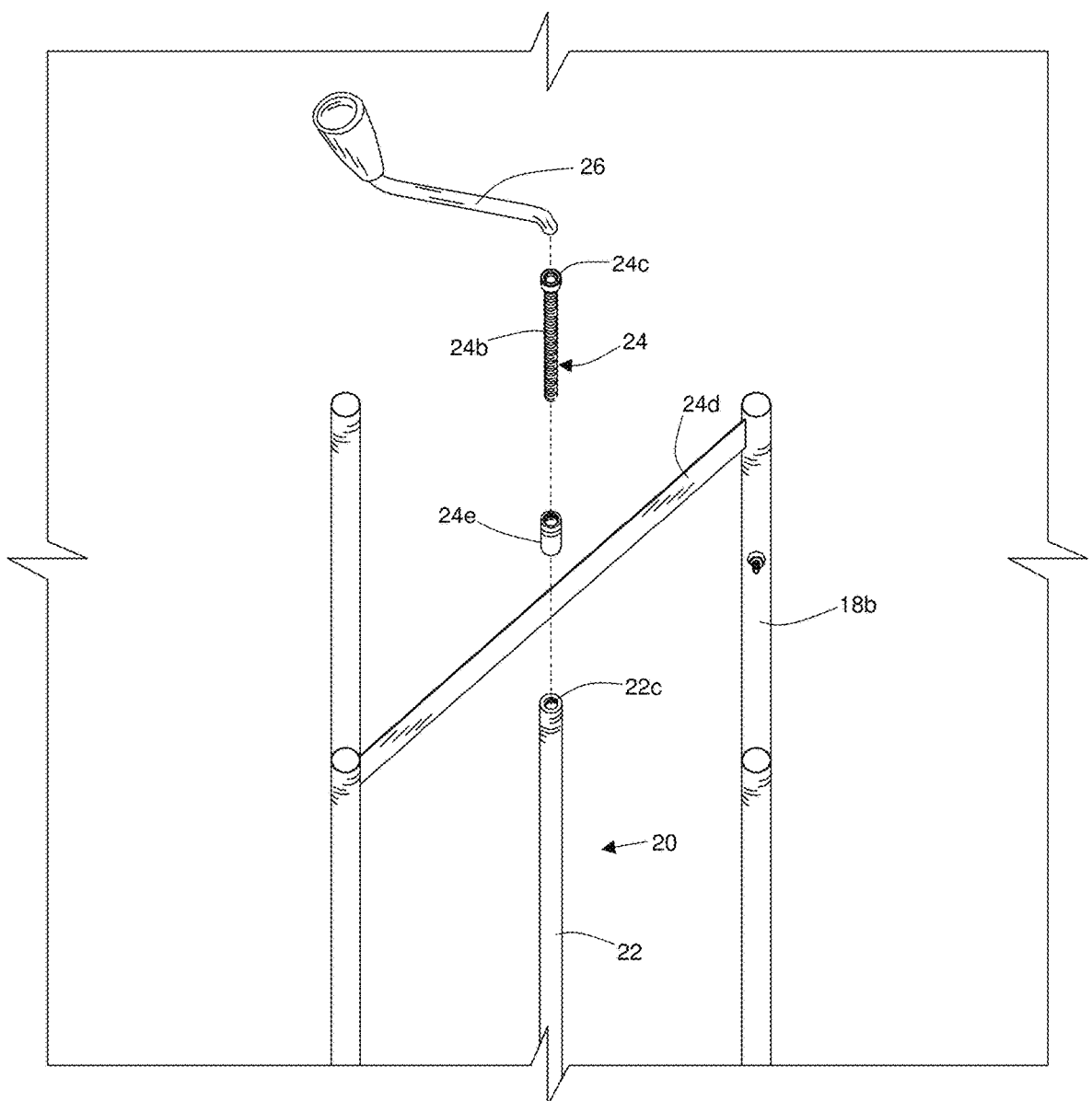
FIG. 8 is a partial exploded view of the wall adjuster components attached to a pair of telescoping support legs.
Figure 9:
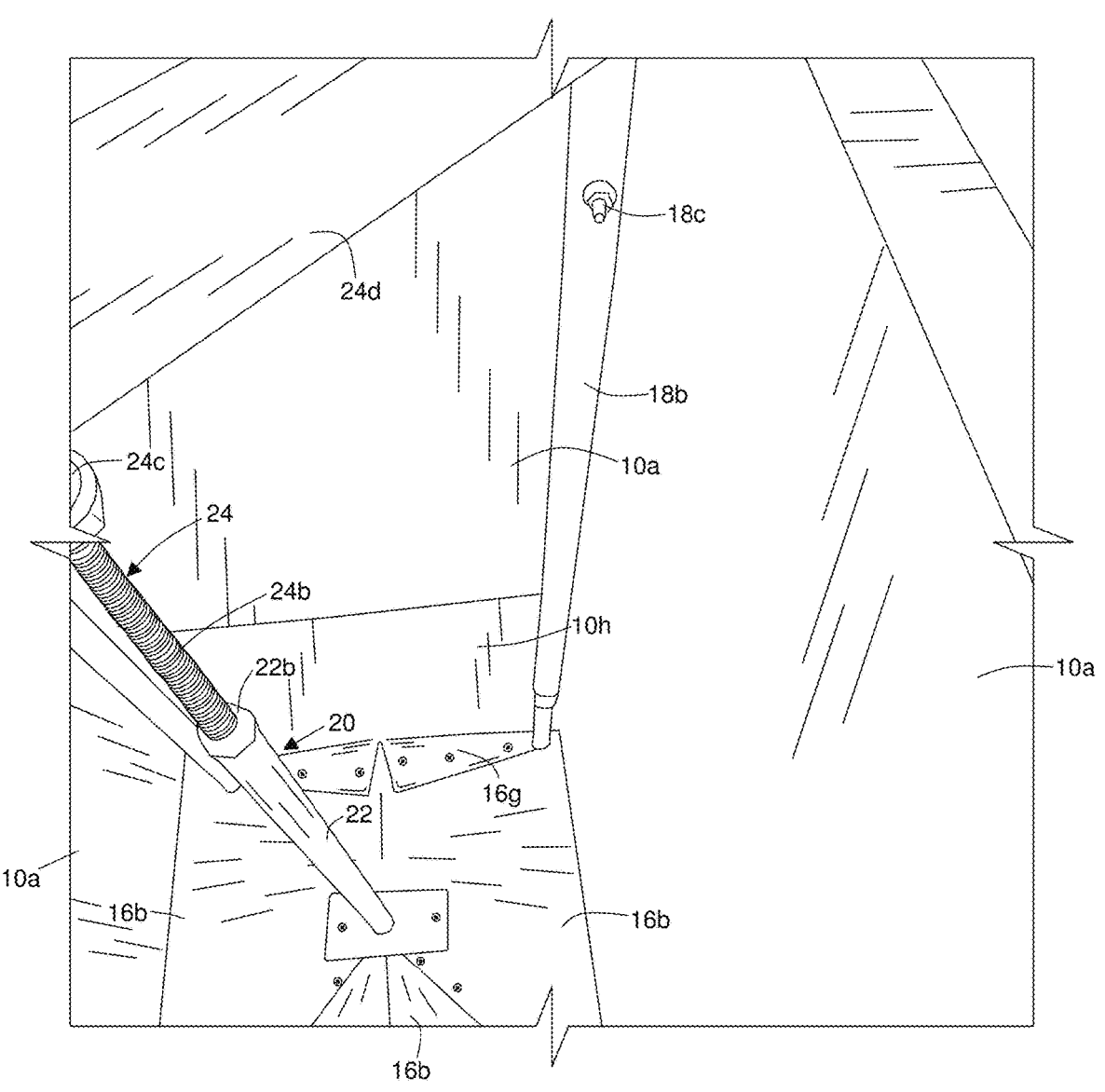
FIG. 9 is a second detail top view of the universal feeder according to the invention, showing the storage space inside the container.
Figure 10:
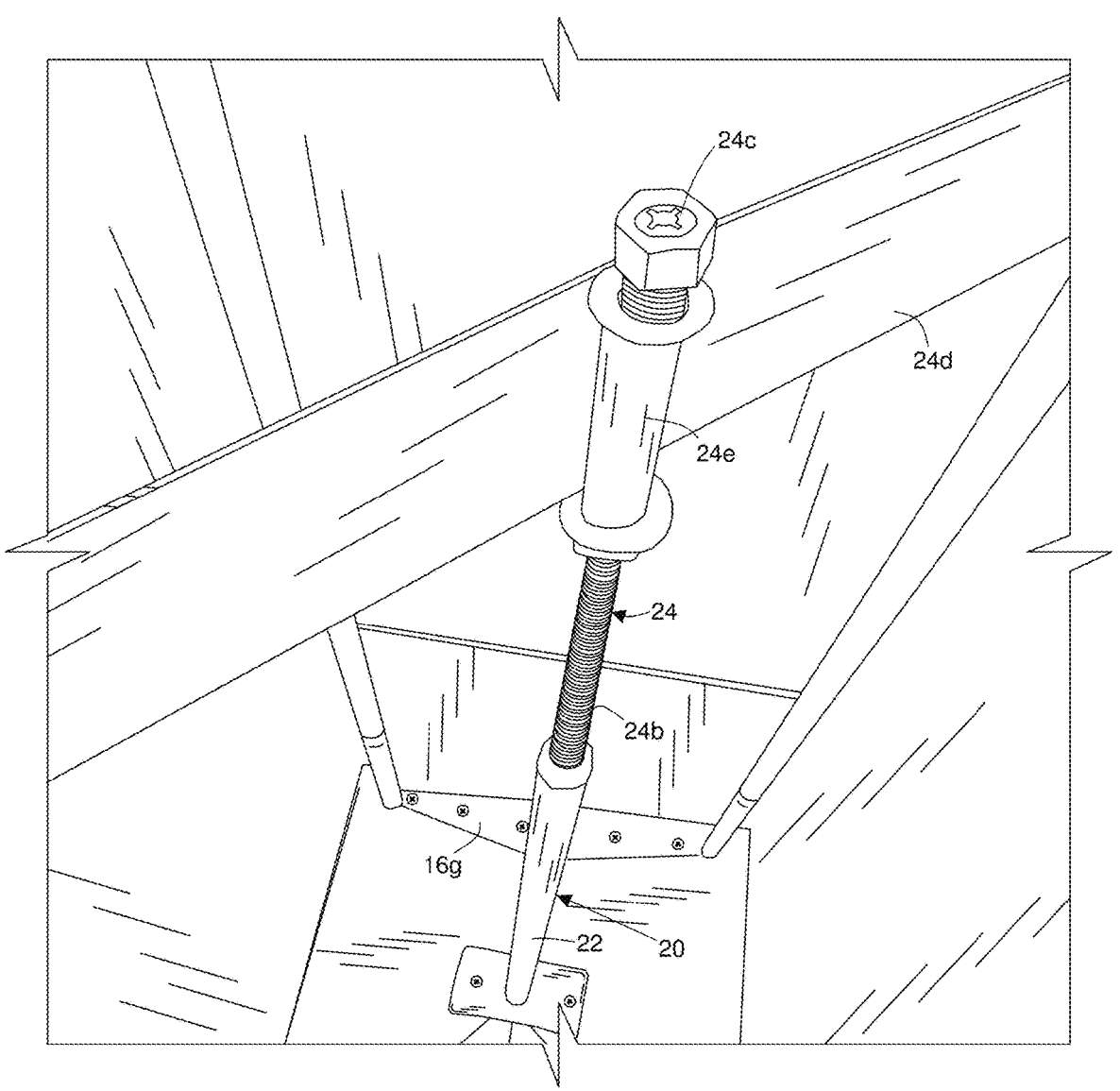
FIG. 10 is a third detail top view of the universal feeder according to the invention, showing the wall adjuster.
Figure 11:
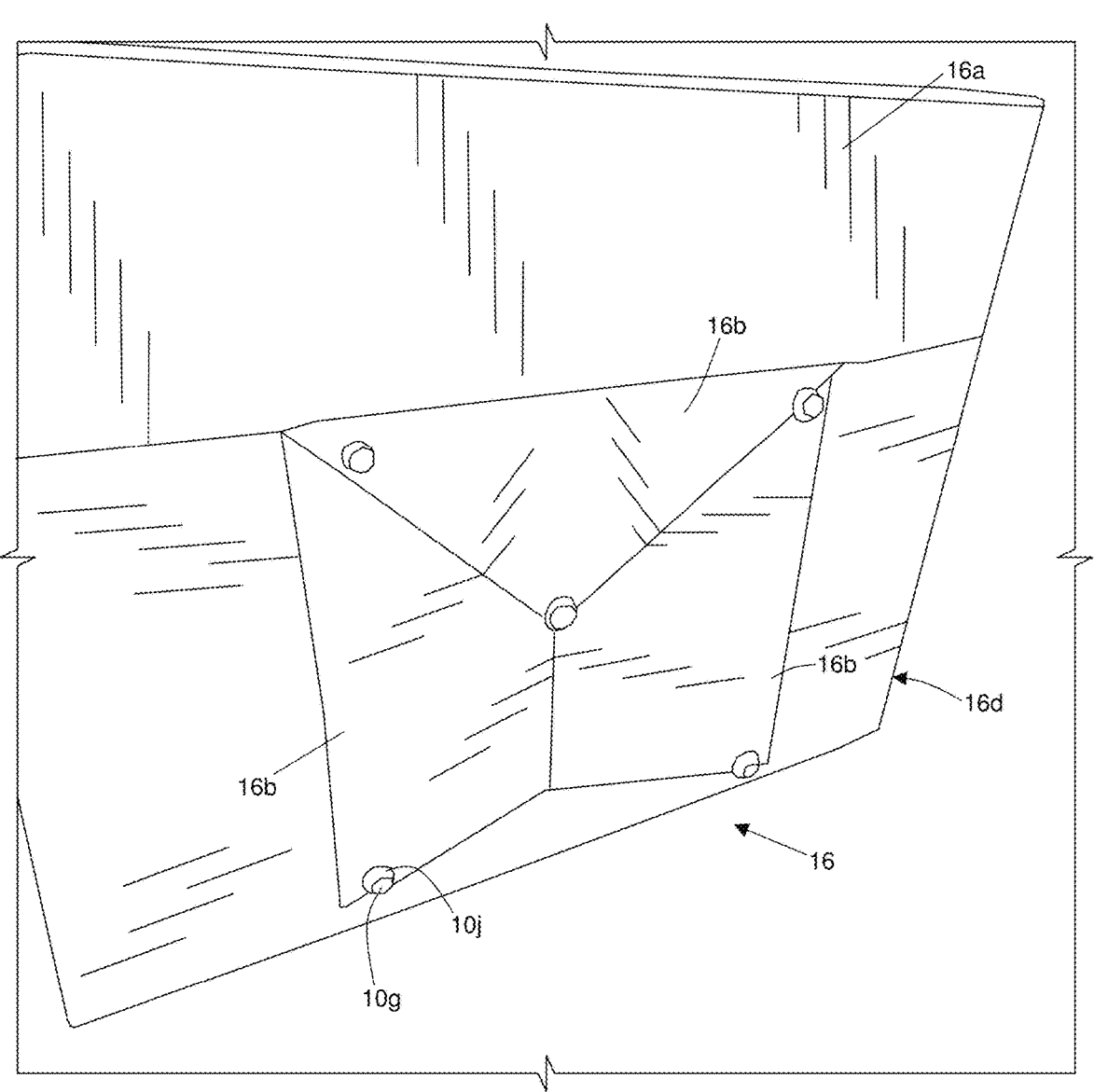
FIG. 11 is a bottom perspective view of the feeder tray of the universal feeder according to the invention.
Figure 12:
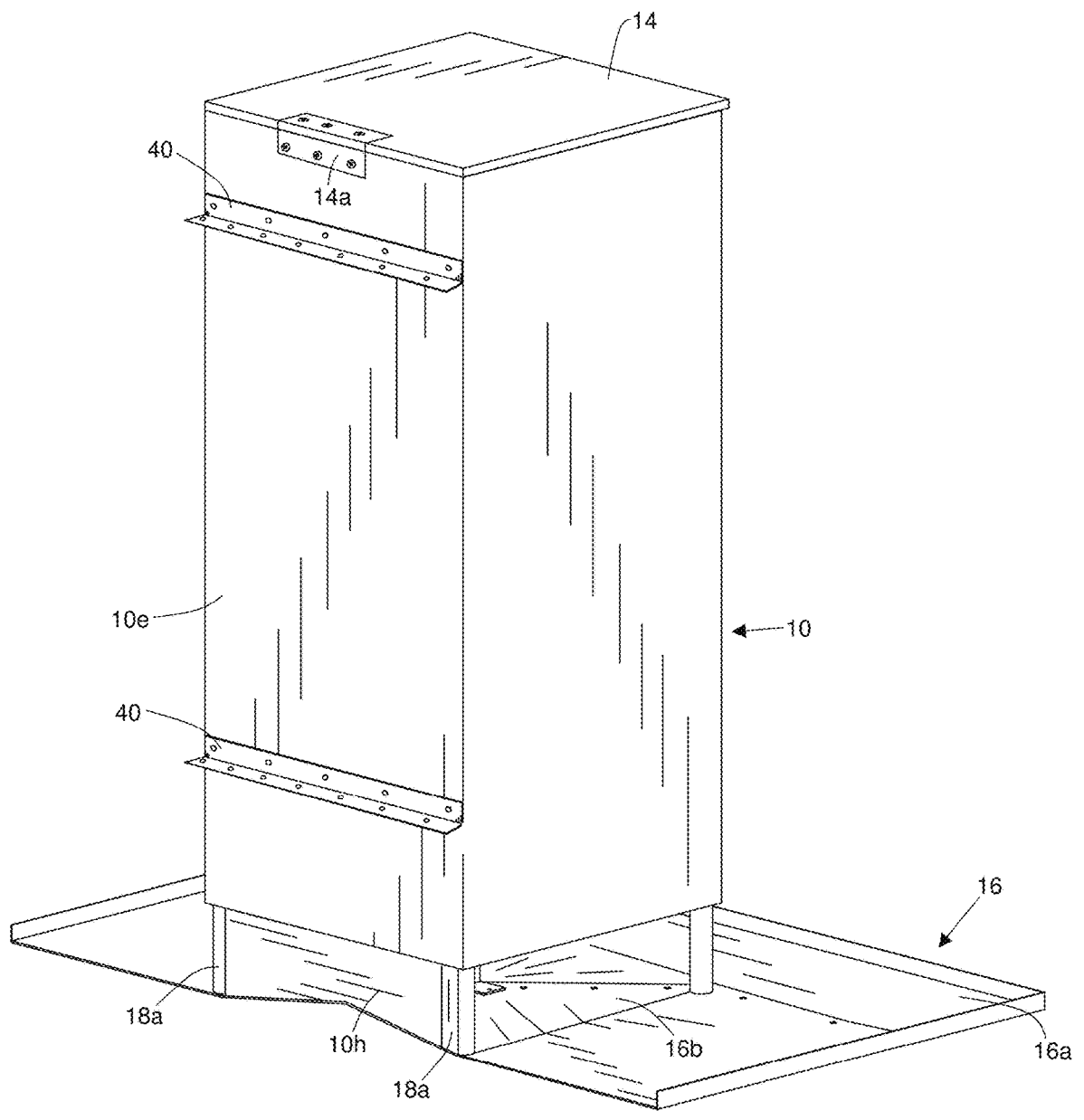
FIG. 12 is a second back perspective view of the universal feeder according to the invention, shown with a hinged lid.
Figure 13:
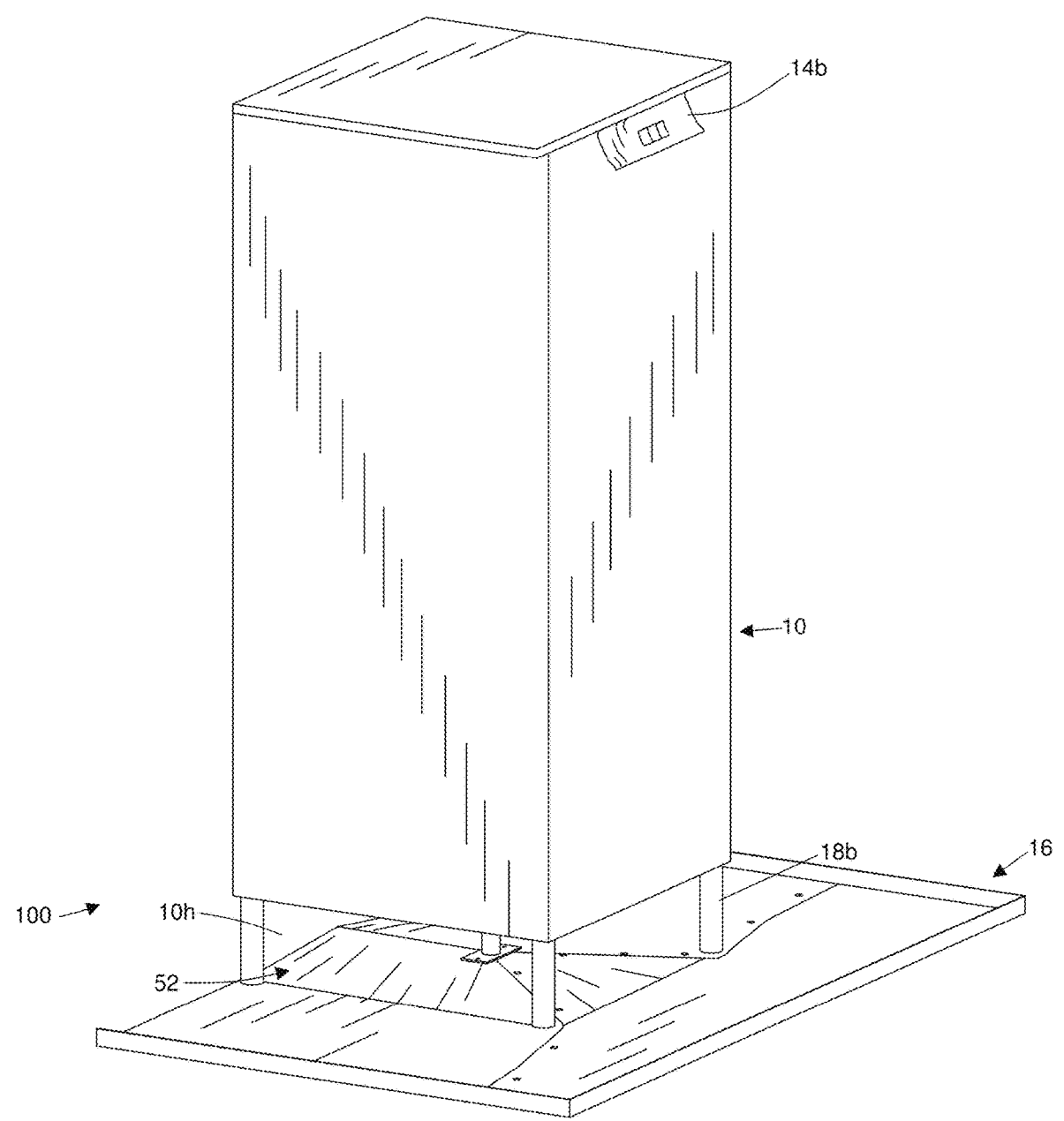
FIG. 13 is a front perspective view of the universal feeder in FIG. 12, showing a latch or other mechanical means for securing the lid to the container wall.

The representative embodiments in the FIGS. show both a representative manual operation of the wall adjuster using a hand crank 26, and an optional power operated assembly. The representative embodiment shown in FIG. 8 for instance features the removable crank handle 26, while the power operated assembly 110 uses a motor 28, controller 32, and power supply 30 used in lieu of the crank handle 26. The inventor notes that ideally the crank handle 26 is removable, however in some embodiments, the crank handle 26 could be permanently affixed to a handle end 24*c* of the wall adjuster 20 and can be any style of manually turned handle.

The horizontal element 24*d* in the representative embodiment is fixed to the moving inner tube 24 at the attachment point 24*e* and is removably affixed to the container end 18*b* of the support leg 18. In the representative embodiment, the horizontal element 24*d* is fixedly attached to the container end 18*b*, however the inventor notes that the horizontal element 24*d* could be removably mated to the container end 18*b* using known mating elements, such as slot and pin, or could even just use gravity such that the horizontal element 24*d* is supported on one or more flanges extending out of the container end 18*b* or using other suitable known mechanical arrangements. While the representative embodiment in the FIGS. shows the wall adjuster 20 housed within the storage space 12, it is also possible to position the wall adjuster 20 outside the storage space 12 by subdividing the storage space 12 and positioning the horizontal element 24*d* so as to be parallel with the back side of the container. The apex 16*e* could be at the back side of the container wall with the wall adjuster 20 immediately adjacent the back side wall. This other arrangement can also be positioned outside of the container, along the back side of the container, with a separate optional compartment formed to house the wall adjuster 20 and horizontal member 24*d* and to allow the brackets 40 to be used to allow the universal feeder 100 to be secured. A vertical position of the container relative to the feeder tray 16 is designed to adjustably control the size of the feed dispensing slot 52, but the slot 52 size can also be more fixedly maintained by one or more positional couplers 18*c*, shown in the FIGS. as a bolt and wingnut coupling assembly, that prevent the container end 18*b* from telescoping up or down over the bottom end 18*a* of the support leg 18 and can also be used to more securely close off the feed dispensing slot 52, as shown in FIG. 5 where the slot 52 is closed and the lower end 10*d* of the side wall 10 of the container rests on the feeder tray 16.

In the representative embodiment in the FIGS., the container end 18*b* is formed with a series of leg apertures 18*d* sized and shaped to receive the positional couplers 18*c*. The positional coupler 18*c* can be configured in many ways, including push spring pins that allow easy tool-free adjustment, cotter pins to insert into aligned holes formed into the horizontal element 24*d* and the container end 18*b*, etc. If used, a minimum of one positional coupler 18*c* and one leg aperture 18*d* are required. The inventor notes that the horizontal element 24*d* is affixed closer to the handle end 24*c* of the inner tube 24, so as to minimally interfere with the feed 50 stored inside the storage space 12, however in other embodiments, the horizontal element 24*d* can be positioned along any part of a moving portion of the vertical assembly, including closer to the feeder tray 16 relative to the lid 14.

The power operated assembly 110 option shown in FIG. 7A allows for many useful improvements include incorporating a wireless receiver and transmitter 36, a camera 34, sensors 34*b*, timers 34*a*, etc. to allow the user to remotely monitor the universal feeder 100, the feed 50, and data about the feeding animals, as well as transmit instructions to the camera 34, timers 34*a*, and controller 32 using a software application on an electronic device such as a computer or a handheld smartphone, allowing the user to control opening, closing and size adjusting the feed dispensing slot 52. The term "sensor" in this disclosure includes any assembly or device that collects or transmits information, and includes speakers that can detect and transmit sounds, and lights that can be deliberately turned on or off separately or in conjunction with operation of the camera 34, motor 28, etc.

In particular, the camera 34 is useful for monitoring animals intended to be fed, such as deer 56 and turkeys 54 as well as classic farm animals such as goats and chickens. Feeder assemblies are plagued by unintended animals accessing the feed 50, so feed 50 loss can be monitored using the camera 34 and other sensors 34*b* to provide the user useful information, for instance, such as that raccoons and rats are sneaking in while the user's goats are being fed. The camera 34 facilitates monitoring of the feed level within the storage space 12 and/or determining rates of consumption by the animals intentionally and unintentionally being fed, with the container position used to limit unwanted or overfeeding by controlling the feed dispensing slot 52 size or closing it entirely. The camera 34 also allows the user to monitor his or her own animals and their feeding habits, and speakers (included in FIG. 7A as another type of sensor 34*b*) can allow the user to speak to his animals, or to a helper at the feeder, if needed, or also collect sound information at the feeder 100. The camera 34 could include an optional sensor 34*b* to alert the user when an animal is feeding, such as auditory, visual, vibrational, and other data, and/or to trigger opening/closing/size adjusting of the feed dispensing slot 52. Timers 34*a* can also be used to automatically open and close the feed dispensing slot 52 when animals have an established feeding schedule. Lights, as another type of sensor, can be added as a way to better visualize animals during evening hours, provide light to the user when filling the storage space 12 in the early dawn hours when farm chore time often starts, or to scare away nocturnal animals by turning on automatically when unwanted animals are present. Similarly, sounds at the feeder 100 can be transmitted back to the user's electronic wireless devices (smartphones, computers, etc.,) or to the controller that can act to protect the feed 50 by closing the feed dispensing slot 52, or alternatively to open the slot 52 if the user's animals are detected by recognized data, such as the clucking of chickens or soft bleating of sheep.

The inventor is a farmer and notes the power operated assembly 110 example shown in FIG. 7A has many possible uses and configurations. For instance, if the user sees that his goats have finished eating but now the quantity of feed 50 dispensed and spread out on the feeder tray 16 is being eaten by raccoons, the user can immediately signal to the receiver 36 to engage the motor 28 and lower the container onto the feeder tray 16, thus closing off the feed dispensing slot 52 and preserving the feed 50. The inventor notes that the software application on a smartphone or a special handheld device is likely the most convenient way to send and receive messages and information back and forth with the power operated assembly 110. In some embodiments, not shown, when multiple universal feeders 100 are used, the user can designate one feeder 100 as a primary feeder, where instructions are received and then transmitted from the primary feeder to a second or multiple feeders within a transmitting range, allowing the user to provide a single instruction to control all feeders 100. The primary feeder can also be used to receive information from the other feeders and transmit that information back to the user, as way to simplify the user's control and monitoring of the feeders 100. This arrangement is most suited to an area with multiple feeders in close proximity. In other arrangements, multiple feeders can be operated independently, so for instance, if the user wants to close feeders in a horse pen and open feeders outside of the pen (for feeding deer, for instance), the user can send separate instructions to the specific feeder in question, as desired. With the primary feeder setup, instructions to specific feeders can also pass through the primary feeder and then transmitted from the primary feeder to the relevant feeder.

The inventor notes that the use of the camera 34, the wireless receiver/transmitter 36, and the power supply 30 can also still be incorporated into the crank handle 26 operated embodiment of the universal feeder 100, so the representative power operated assembly 110 in the FIGS. is not meant to limit the incorporation of these components to just the motorized version but to show one useful embodiment of how these components can be incorporated into the universal feeder 100. The option to use either the crank handle 26 or the motor 28 is an attractive safeguard when there is loss of power, and the inclusion of cameras 34, sensors 34*b* etc. do not mean that all the suggested parts in FIG. 7A must be incorporated into the universal feeder 100, and the user can have the option to include as many or as few as desired. A simple feeder setup could just have the motor controlled by a timer, for instance, and not include cameras or other sensors.

Figure 14:
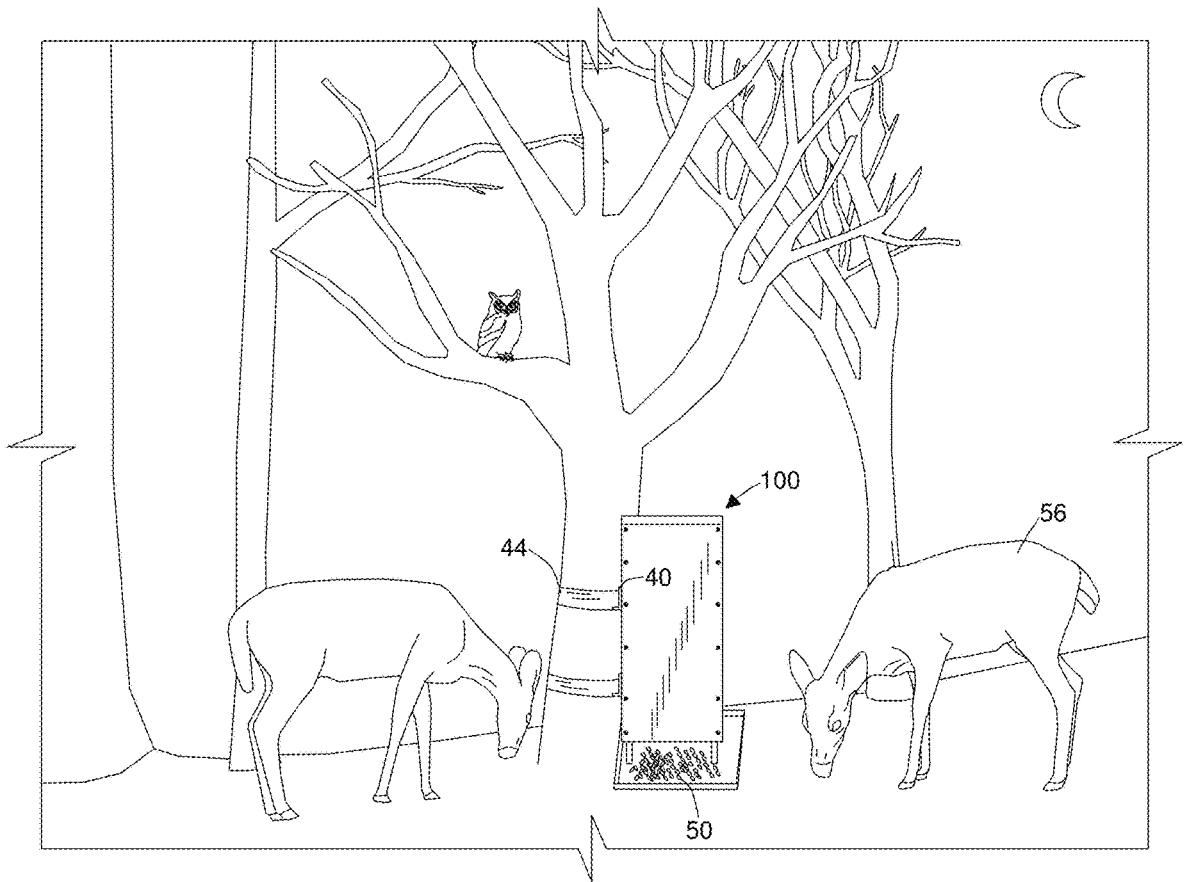
FIGS. 14 and 15 are side views of the universal feeder according to the invention, shown adapted to feed two different types of animals.
Figure 15:
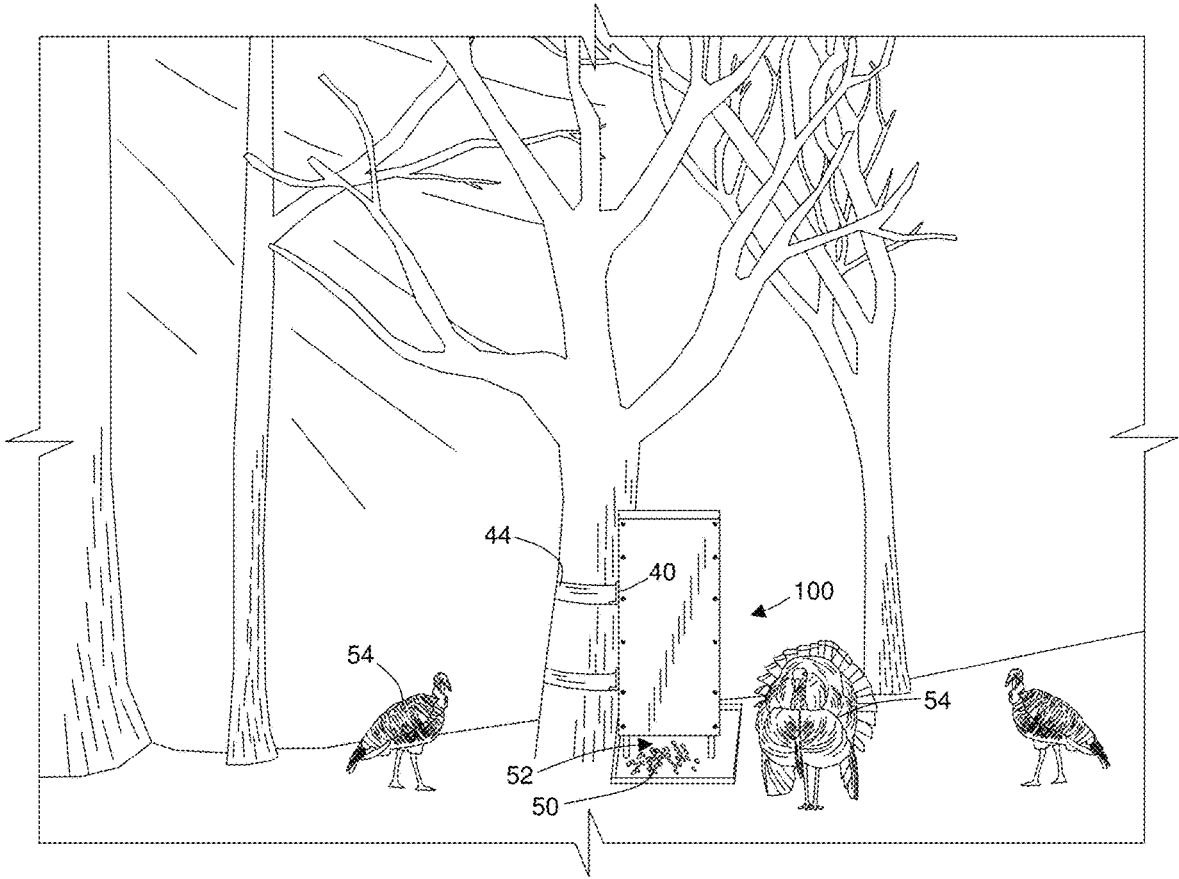

To use the universal feeder 100, as shown in FIGS. 14 and 15, the universal feeder 100 is positioned in a desired location, typically with the back side 10*e* of the outer side 10*b* of the container facing a wall or a tree and secured thereto with the strap 44, rope, or other known fastening means using the brackets 40 and if desired, the bracket holes 42. The bracket 40 can also be positioned so that a flange of the bracket bearing the holes 42 is reversed from what is shown in the FIGS., so the pair of brackets 42 could be mirror images of one another, for instance, if desired. The ground-facing side 16*d* of the feeder tray 16 may include spikes, grooves or be texturized to further prevent the universal feeder 100 from moving around on a ground surface. Once positioned, the user removes the lid 14, fills the storage space 12 with the feed 50, which includes corn, corn cobs, hay, oats, seeds, etc. and then either attaches the manual crank handle 26, or for the motorized version, attaches the motor 28 and its components, or simply powers the motor 28 to raise the container side wall 10 to create the feed dispensing slot 52 of a desired size. Once a desired feed dispensing slot 52 size is achieved, the motor 28 is turned off or the user stops turning the crank handle 26, the lid 14 is replaced and secured to the container, using the latch 14*b* and hinge 14*a* system for the lid 14, a lid spring 10*f*, or any other known way of securing the lid 14 to the container. The latch 14*b* shown is a simple locking latch that is representative only and any known mechanical means for removably securing the lid 14 to the container is suitable. Other known ways to secure the lid 14 include using a ratchet buckle and strap, such as how beehives are currently secured, or by even putting the hinge 14*a* on the front and the latch 14*b* toward to the back side of the feeder to make it more difficult to open when the feeder 100 is secured to the tree or other structure along the back side 10*e*.

The slot size determines the rate at which the quantity of the feed 50 is dispensed and the user can size the slot to prevent overfeeding or to control the rate of feeding. For instance, if corn cobs are fed, the feed dispensing slot 52 can be sized slightly larger than the cob to force goats or other animals to work harder to remove the cobs, thus preventing overfeeding that may occur if the cobs were allowed to roll freely out of the feed dispensing slot 52. The sloped portions 16*b* of the feeder tray 16 ensure that all the feed 50 is dispensed efficiently by gravity and only to areas of the feeder tray 16 accessible by animals. The feeder tray 16 is further comprised of a lip 16*h* around the outermost perimeter of the flat portion 16*a* to help keep the feed 50 on the feeder tray 16 and maintain cleanliness of the yard. In the representative embodiment in the FIGS., there is no lip 16*h* along the back facing side of the feeder tray 16, as this is optional but the feeder tray 16 could include a lip along an entire perimeter of the feeder tray 16. The lack of a lip on the back side is to allow water to drain more easily or for easier cleaning, and the inventor notes that the term "flat portion" could in fact be minimally sloped backwards to allow water drainage without encouraging feed 50 to move towards the back side of the feeder tray 16.

If the camera 34 and other elements of the powered assembly 110 are included, the user can configure the assembly 110 as desired, to just transmit instructions, or to receive and transmit information, and even allow the universal feeder 100 to self-adjust the feed dispensing slot 52 according to data collected over time by the various sensors 34*b*, etc. Inclusion of the camera 34 and wireless receiver and transmitter 36 with either the power operated 110 or manually operated embodiments allows the user to monitor the types and numbers of animals feeding, as well as remotely monitor the amount of the feed 50 in the storage space 12. The power operated embodiment 110 can allow the user to check on the animals, open and close the feed dispensing slot 52 as desired, and could include automatic timers 34*a* so that the feed dispensing slot 52 opens and closes at predetermined times, to prevent overfeeding and unauthorized feeding or spoilage of the food. The sensor 34*b* includes a variety of sensors, such as moisture sensors that can automatically close the feed dispensing slot 52 to prevent spoilage, motion sensors that open the feed dispensing slot 52 when animals are near the feeder tray 16, as well as light/dark sensors that automatically open and close the feed dispensing slot 52, depending on the eating schedules of the animals. The sensors 34*b* along with the camera 34 can be used to identify specific types of animals intended to be fed, and thus the inventor's goats, upon approaching the universal feeder 100 are identified as the intended animals to be fed and the feed dispensing slot 52 opened. If a bear approaches the universal feeder, the sensors 34*b* and camera 34 could similarly communicate to the motor 28, etc. to close the feed dispensing slot 52.

The inventor notes that the camera 34 can be used with or without sensors 34*b*, and instead of using motion or sound sensors 34*b* that trigger use of the camera 34, RFID tags already commonly used on farm animals can be used with the power operated assembly 110, with the RFID tags transmitting information about the animals to the transmitter/receiver 36. Use of RFID tags can alert the user as to the number and identity of his animals visiting the universal feeder 100 as well as open/close the feed dispensing slot 52.

Such information would allow the user to understand eating patterns and behaviors, as well as serve as an easy way to keep track of his herd. Information from the RFID tags can be transmitted to the receiver and then accessed by the user, using the software application designed for this purpose. This information can be stored at the feeder 100 itself or uploaded to the cloud for longer storage and access.

The controller 32 can include an artificial intelligence (AI) module, allowing the data collected by the sensor 34*b* and camera 34 to be quickly processed, teaching the universal feeder system the animals' established eating patterns and quantity of food consumed within a certain time period, thus the universal feeder 100 can be self-adjusting once installed. When multiple feeders 100 are used, they can be filled with different types of feed 50 and provide the user information such as what food is preferred by which animals, for instance, or possibly alert the user as to issues with feed in a certain feeder 100, which upon further investigation may prove to be spoiled, etc. Currently, the only way the user is aware of issues with any feeder and its feed is through manual inspection.

It is to be understood that the above-described arrangements are only illustrative of the application of the principles of the present invention. Numerous modifications and alternative arrangements may be devised by those skilled in the art without departing from the scope of the present invention. The inventor notes that the container, with its square tube shape in the representative embodiment, can be taken apart and shipped or stored flattened, along with the feeder tray 16 shown with various cuts and fasteners designed to allow it to be flattened and stored. These fasteners and various holes are not needed if there is need or desire to store or ship the universal feeder 100 in a more compact form. While the various parts are shown using mating fasteners such as bolts 10*g* and nuts 10*j* mating into appropriately sized holes 10*i*, other mating systems could be used, including mating grooves, pins, and other known mechanical mating systems.

The universal feeder 100 can be any size, height and shape, and works equally well if tall and skinny, or short and wide, and thus can accommodate many different types of animals and their feed. Larger capacity feeders allow the user to fill the storage space 12 once a week, for instance, which significantly reduces the work normally associated with animal husbandry, as animals are typically fed multiple times a day. People who raise a variety of animals that eat the same feed can fill the universal feeder 100 once and feed many animals using the same feeder instead of purchasing multiple types of feeders, which is the current norm. The storage space 12 can also be divided into vertical compartments, so that different types of feed can be stored and dispensed on different sides of the feeder tray 16 and potentially different types of food with different hydration to prevent spoilage if they are mixed together. Hence, goats and chickens can be fed with a single feeder, even if different foods are required or desired to be fed.

The universal feeder 100 is versatile, allowing the user to purchase one type of feeder to feed many different animals. The incorporation of sensors 34*b* and other electronics provides the user much valuable data not otherwise easily collected, allowing the user to more efficiently plan purchases and understand costs associated with feeding as well as feed loss due to unintentional feedings, or overfeeding of some animals, as well as a way to track the movements of specific animals when RFID tags or other sensors are used. The representative embodiments described in this disclosure are not meant to limit the invention to just what is shown but serves as some examples of how the universal feeder can be configured and implemented to feed different types of animals, and different dried foods anywhere, using only one feeder style.

I claim:

1. A universal feeder, comprising:

a container having at least one side wall with an inner-facing side defining a storage space, the at least one side wall having an upper end, a lower end, a feed access side, and a non-feed side;

a feeder tray having a sloped portion and a flat portion, the sloped portion comprising at least one triangular sloped face with an uppermost apex positioned above the flat portion and the at least one triangular sloped face having a lowermost end positioned within the storage space when the lower end rests on the flat portion of the feeder tray adjacent an intersection of the flat portion with the sloped portion;

a telescoping support leg having a bottom end connected to the feeder tray and a container end attached to the at least one side wall;

a removable lid sized and shaped to cover the upper end of the at least one side wall;

an inner wall inside the storage space, the inner wall having a bottom end attached to the sloped portion and the uppermost apex, such that the bottom end approximates an inverted V-shape, and an upper end in slideable relationship with the inner-facing side of the container on the non-feed side;

a wall adjuster having a top end and a bottom end, and a moving tube in telescoping, rotatable relationship with a fixed tube via mating threads;

a horizontal element attached to both the moving tube of the wall adjuster and to the container end of the telescoping support leg such that the horizontal element is perpendicular to the wall adjuster;

wherein the bottom end of the wall adjuster is attached to the uppermost apex and a bottom end of the sloped portion is immediately adjacent the flat portion of the feeder tray, such that the bottom end of the sloped portion meets the flat portion of the feeder tray at an angle facing the feed access side of the at least one side wall;

wherein the top end of the wall adjuster is further comprised of a handle end adapted to receive either a crank handle or a motor with a power supply and controller for actuating the motor, the crank handle or the motor adapted to rotate the moving tube of the wall adjuster clockwise or counterclockwise; and a feed dispensing slot between the lower end of the at least one side wall of the container and the flat portion of the feeder tray;

whereby the feed dispensing slot is opened when the at least one side wall of the container is lifted above the feeder tray and closed when the at least one side wall of the container rests on the feeder tray.

2. The universal feeder in claim 1, wherein the at least one side wall is further comprised of at least one rectangular wall further formed with one wall aperture adapted to receive a wall fastener.

3. The universal feeder in claim 1, wherein the telescoping support leg is further comprised of four telescoping support legs and the container is further comprised of a square or rectangular cross section with four interior corners within the storage space; and wherein each corner of the four interior corners has one leg of the four telescoping support legs attached thereto.

4. The universal feeder in claim 1, wherein the non-feed side has an outer-facing side, and at least one bracket affixed thereto, whereby the universal feeder is configured to be removably secured to a tree.

5. The universal feeder in claim 4, wherein the at least one side wall is further comprised of a second bracket in parallel, spaced apart relationship with the bracket.

6. The universal feeder in claim 1, wherein the lid is hingeably attached to the upper end of the at least one side wall and secured thereto using a mechanical fastener.

7. The universal feeder in claim 1, wherein the sloped portion of the feeder tray is further comprised of a first sloped wall, a second sloped wall, and a third sloped wall sandwiched between and immediately adjacent the first and second sloped walls, whereby the first, second and third sloped walls directs a quantity of feed stored within the storage space away from the non-feed side.

8. The universal feeder in claim 1, wherein the feeder tray is further comprised of a first part removably attached to a second part, whereby detaching the first part from the second part allows the sloped portions to be flattened for storage or transport.

9. The universal feeder in claim 1, wherein the lowermost end of the wall adjuster is removably affixed to an apex of the sloped portion.

10. The universal feeder in claim 1, further comprising a timing assembly in communication with the motor, controller and the power supply, whereby the container is configured to lift or lower at desired pre-set times.

11. The universal feeder in claim 1, wherein the telescoping support leg is positioned at the non-feed side; and wherein the telescoping support leg and the inner wall are a same structure.

12. The universal feeder in claim 1, wherein the at least one side wall is further comprised of four walls forming a container with four interior facing corners, the four walls removably affixed along the four interior facing corners whereby the container is configured to be disassembled and stored flat.

13. The universal feeder in claim 1, further comprising a receiver adapted to receive wireless signals, a transmitter adapted to transmit the wireless signals, and the controller adapted to control the motor according to instructions received from the receiver, whereby the container is configured to be lifted or lowered by a user.

14. The universal feeder in claim 13, further comprising one or more sensors in communication with one or more of the power supply, the transmitter and receiver, the controller, and the motor.

15. The universal feeder in claim 14, wherein the one or more sensors is adapted to detect one or more of light, moisture, temperatures, movement, and sound.

16. The universal feeder in claim 15, wherein the controller is further comprised of an artificial intelligence module adapted to receive selected information from the one or more sensors and create a schedule for opening and closing the feed dispensing slot based on the selected information received.

17. The universal feeder in claim 14, further comprising a second universal feeder having a same configuration as the universal feeder, wherein the second universal feeder, upon receiving instructions, transmits the instructions to the second universal feeder, whereby the universal feeder and the second universal feeder are operated in sync with one another.

* * * * *